United States Patent [19]

Nutt

[11] 4,184,236
[45] Jan. 22, 1980

[54] ASSEMBLY MACHINE

[75] Inventor: Helmut Nutt, Bevaix, Switzerland

[73] Assignee: Mikron Haesler S.A., Boudry, Switzerland

[21] Appl. No.: 901,832

[22] Filed: May 1, 1978

[30] Foreign Application Priority Data

May 26, 1977 [CH] Switzerland ............ 6482/77

[51] Int. Cl.² ............................................. B23P 19/04
[52] U.S. Cl. .................................. 29/38 R; 29/564.1; 29/742; 29/792
[58] Field of Search ...................... 29/38 R, 38 A, 564, 29/564.1, 742, 791, 792, 795

[56] References Cited

U.S. PATENT DOCUMENTS

| 2,358,389 | 9/1944 | Ewart et al. ...................... 29/38 A |
| 3,131,455 | 5/1964 | Tarzian ............................... 29/38 R |
| 3,143,792 | 8/1964 | Swanson et al. ....................... 29/564 |
| 3,158,053 | 11/1964 | Lange ..................................... 82/3 |

FOREIGN PATENT DOCUMENTS

| 1095764 | 6/1955 | France . |
| 1373713 | 8/1964 | France . |
| 268604 | 9/1950 | Switzerland . |
| 292483 | 11/1953 | Switzerland . |
| 328517 | 4/1958 | Switzerland . |
| 331615 | 9/1958 | Switzerland . |
| 230569 | 3/1925 | United Kingdom . |
| 861847 | 3/1961 | United Kingdom . |
| 1010047 | 11/1965 | United Kingdom . |
| 1059771 | 2/1967 | United Kingdom . |

Primary Examiner—Ervin M. Combs
Attorney, Agent, or Firm—Young & Thompson

[57] ABSTRACT

The invention relates to an assembly machine having a frame, an upper plate vertically displaceable, a table, an annular transfer plate, a cam-shaft and a driving device for said cam-shaft. Said machine comprises working units of three kinds, the one fixed onto the upper plate and the others fixed onto the table either inside or outside of the transfer plate. All working units fixed to the upper plate and the ones fixed to the table inside the transfer plate are controlled by cams carried by the cam-shaft and corresponding mechanical linkages passing through a control opening provided in the table of the frame.

3 Claims, 3 Drawing Figures

ASSEMBLY MACHINE

The present invention relates to automatic assembly machines, that is machines which are able to set up assemblies or sub-assemblies and which comprise several working units permitting to achieve machinings, assembling operations, positioning operations and testing operations.

The assembly machine according to the present invention comprises a frame on the lower part of which a cam-shaft is journaled, and a driving device by which said cam-shaft is rotated is mounted within said lower part of the frame. The intermediate part of said frame comprises a fixed table provided with a central opening on which an annular plate is pivoted. The upper part of said frame is formed by a sliding plate sliding along vertical columns rigidly fixed on the intermediate part of the frame, the linear displacenents of this plate being contolled by the cam-shaft by means of a mechanical linkage. Working units are fixed either on the upper plate or the fixed table of the frame and actuated each by means of at least one cam of the cam-shaft and a corresponding mechanical linkage, the mechanical linkages actuating the upper plate and the working units fixed on the said upper plate passing through the central opening of the table of the frame.

The attached drawings show schematically and by way of example one embodiment of the assembly machine.

Figure 1:
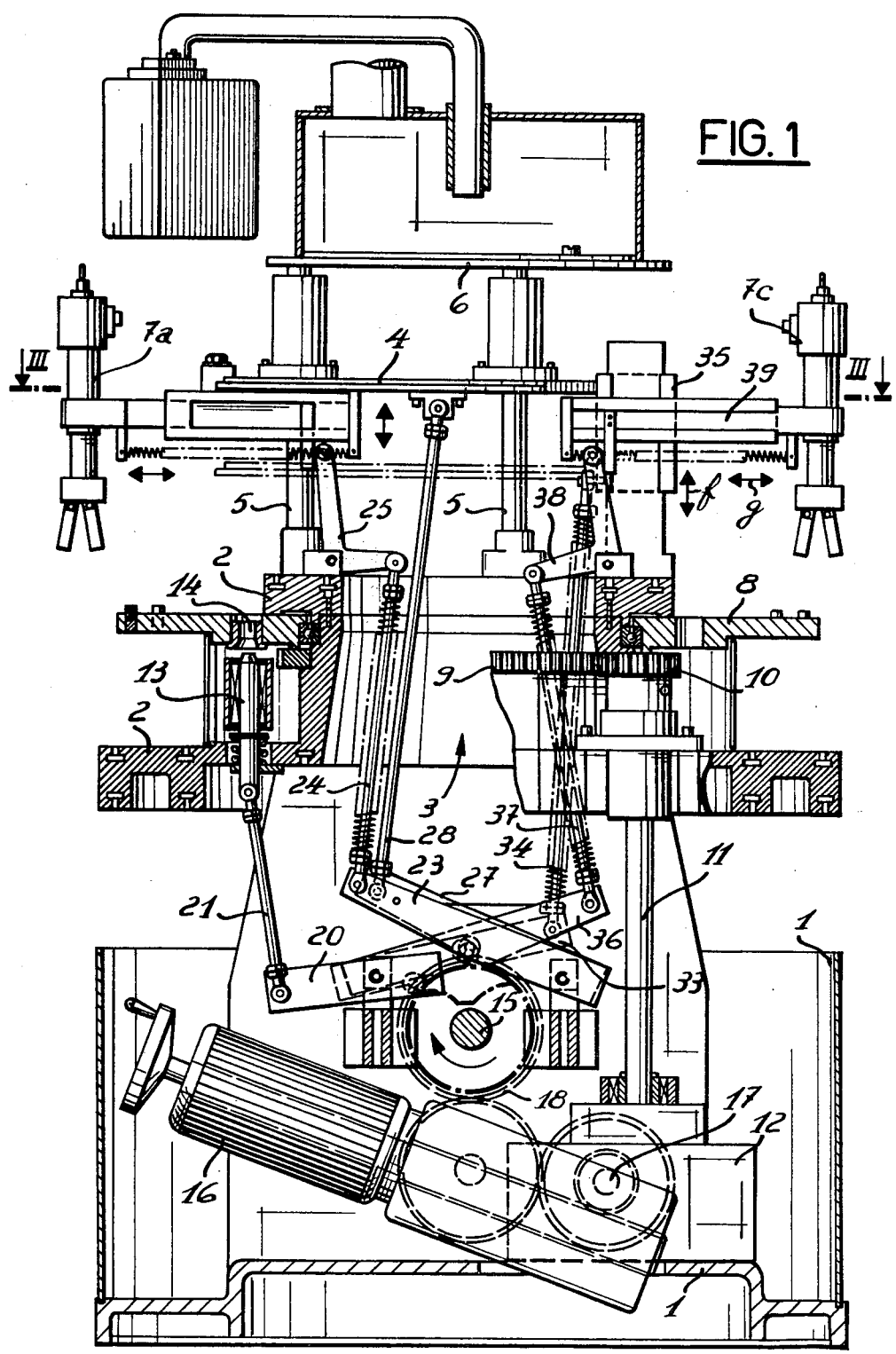
FIG. 1 is a front view of an assembly machine according to the present invention, partially in cross section.
Figure 2:
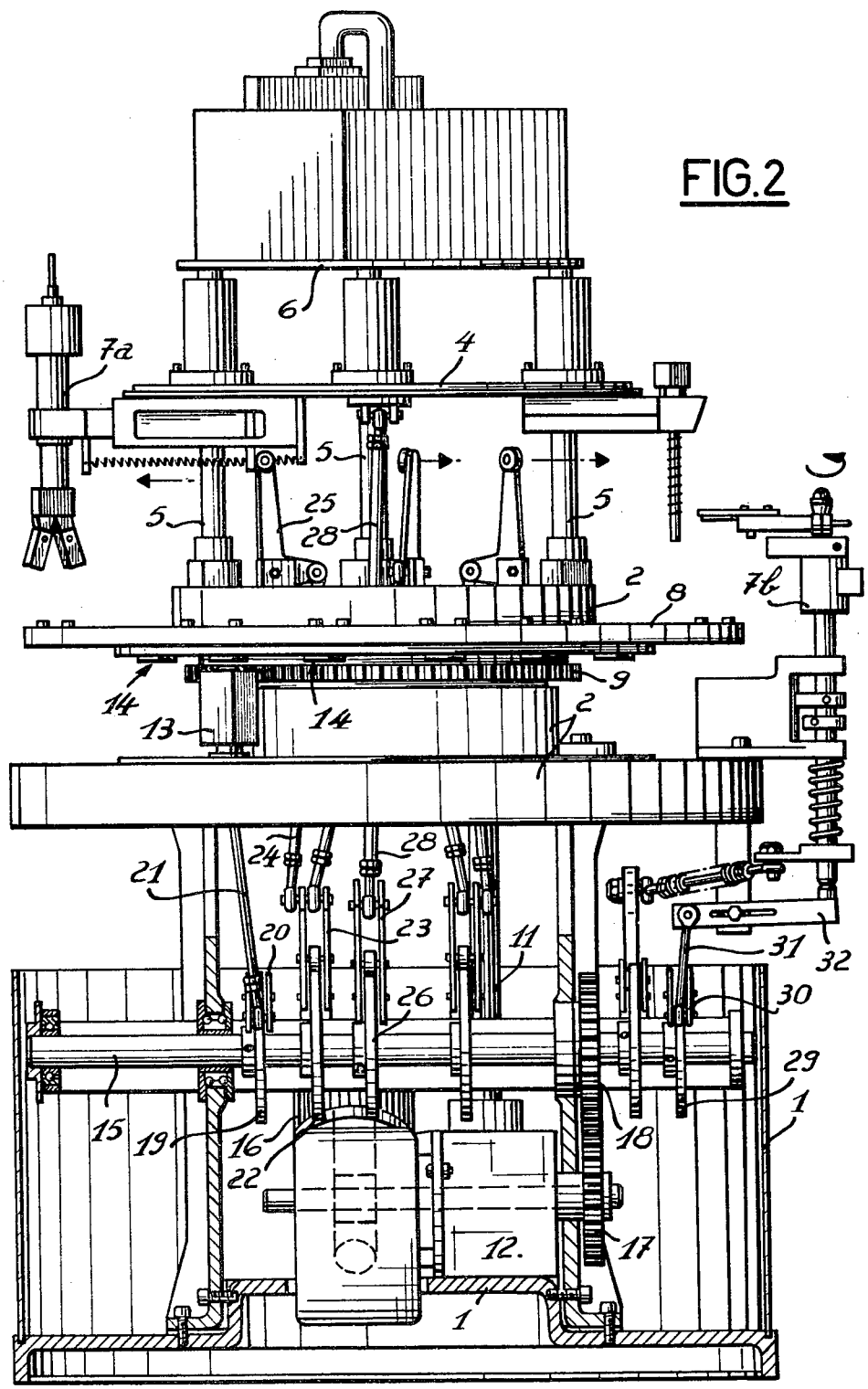
FIG. 2 is a cross-section of said machine taken perpendicular to the cam-shaft.
Figure 3:
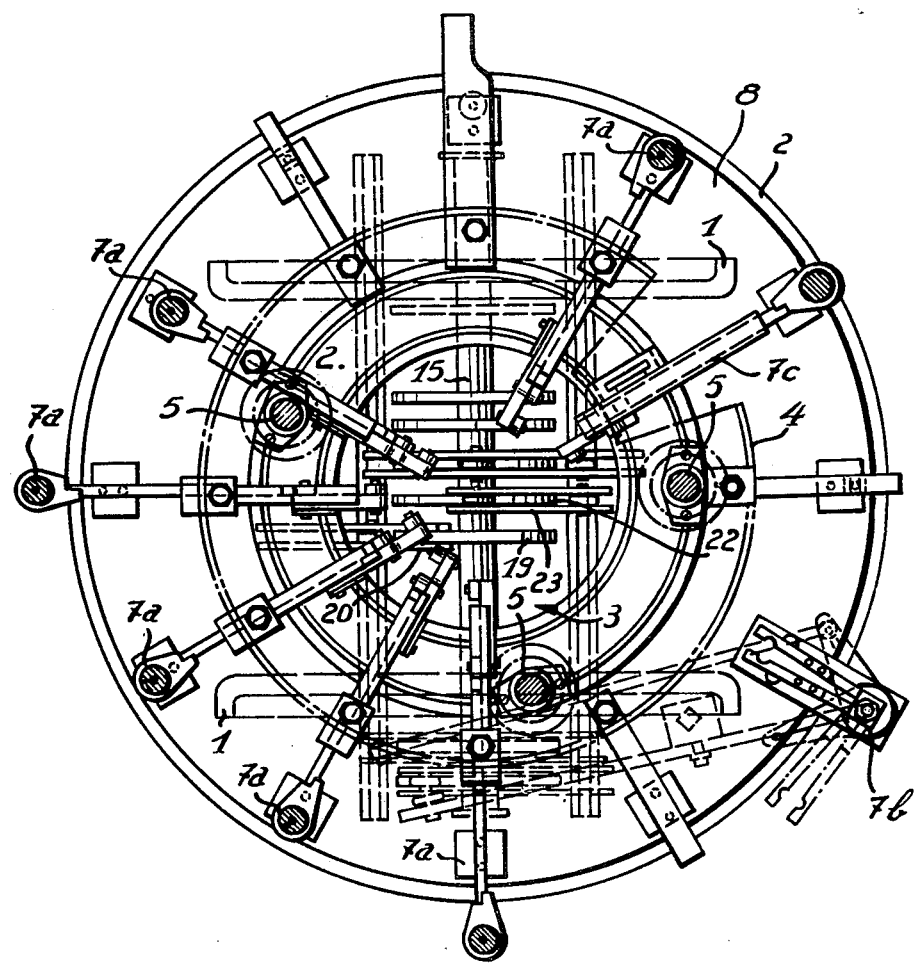
FIG. 3 is a top view of said machine along line III—III of FIG. 1.

The assembly machine shown comprises a frame formed by a lower part 1, an intermediate part comprising a table 2 provided with a central opening 3, and an upper part comprising an upper plate 4 sliding linearly along vertical columns 5 rigidly fastened on the table 2. The upper ends of the columns 5 are connected by means of a plate 6 to give the necessary rigidity to the whole machine.

This assembly machine comprises working units 7a, 7b, 7c formed by positionning units, testing units, assembly units, machining units and so on, mounted either on the upper plate 4 or on the table 2 of the frame.

On the table 2 of the frame a rotative transfer plate 8 is mounted to bring the assemblies or sub-assemblies to be made in front of each working unit. This transfer plate 8 is driven in rotation by means of a toothed crown 9, meshing with a pinion 10 driven by a shaft 11 itself driven in intermittent rotation, for the indexing of the transfer plate 8, by cam or Geneva indexing means 12 for example, means which are in turn driven by the motor 16 driving the cam-shaft 15. The working angular positions of the transfer plate 8 are precisely indexed by means of a dog 13 sliding vertically in the table 2 and cooperating successively with housings 14 provided within the plate 8. This dog 13 is subjected to a resilient action tending to maintain it in its upper indexing position. The linear displacements of the dog 13 are controlled mechanically as will be seen later on.

The cam shaft 15 is journaled on the lower part of the frame 1 and extends on substantially the whole width of the assembly machine, which is the diameter of said machine.

This cam shaft 15 is driven in rotation by means of motor 16 driving the shaft 17 of the indexing means 12 for example through a worm and a worm wheel. This shaft 17 is connected to the cam-shaft 15 by means of a gear train 18 and drives this cam-shaft in continuous rotation. This cam-shaft 15 carries and drives a number of cams depending on the number of movements to be controlled.

Cam 19 cooperates with a follower carried by a tilting lever 20 which actuates the rod 21 and the indexing dog 13. The tilting lever 20 is hinged to the frame 1.

Cam 22 cooperates with a follower carried by a tilting lever 23, also pivoted on the frame 1, and actuating through a rod 24 and a tilting lever 25 the working unit 7a carried by the upper plate 4. The displacements of the upper plate 4 are controlled by a cam 26, a tilting lever 27 and a rod 28.

Other working units can be mounted on the upper plate 4 and each of them is controlled by means of a mechanical linkage similar to those shown (22, 23, 24, 25). Each working unit can be controlled by several cams if more than one movement is necessary for said units; conversely only one cam can control more than one unit if their movement is to be carried out simultaneously.

It is to be seen that all these mechanical linkages are possible due to the presence of the central opening of the table 2 and to the fact that the transfer table 8 is annular. All the cams on the central portion of the cam-shaft 15 may control linkages passing through the central opening of the table 2 giving thus the possibility to individually control a great number of working units fixed onto the upper plate 4.

When, in order to make a given assembly, one needs external fixed working units 7b fixed on the lower annular part of the table 2 they are individually controlled by cams carried also by the cam-shaft 15. So the working unit 7b shown is controlled by the cam 29, the tilting lever 30, the rod 31 and the lever 32.

It is also possible to have internal fixed working units 7c fastened on the upper annular part located inside the transfer plate 8 of the table 2. Such internal fixed units 7c are controlled by one or several cams and their corresponding mechanical linkages. In the example shown the unit 7c is able to effect vertical displacements f and horizontal displacements g. The vertical displacements of this unit are controlled by a cam of the cam-shaft, a lever 33, and a rod 34 the upper end of which is fixed to the slide 35 of the said unit 7c. The horizontal displacements of said unit are controlled by an other cam of the cam-shaft, the lever 36, the rod 37, and the tilting lever 38 pivoted on the table 2 and the upper end of which acts on the slide 39 of said unit 7c.

The novelty and the originality of this assembly machine is to be seen in the use of a cam-shaft located diametrically and of a table having a central opening enabling one to control individually all the working units, mounted rigidly on the table either inside or outside of the transfer plate 8 and all the units fixed on the upper plate which is sliding in a vertical direction.

This solution has a great advantage for the setting of the machine, as each movement of each working unit may be adjusted by itself without affecting on the other working units.

The cams can be made in two parts to be fixed on the cam-shaft without dismounting the said cam-shaft.

It is further to be noted that each working unit 7a, 7b, 7c can be controlled by one or several cams of the cam-shaft by which it is also possible, for simultaneous movments of several units 7 to control several said units by means of only one cam of the cam-shaft 15.

This mechanical assembly machine is therefor very easy to use due to the three types of working units and due to the design of this control by means of only one cam-shaft and mechanical linkages which may pass either through the center of the frame or on the outside of the table 2.

I claim:

1. An assembly machine comprising a stationary frame, a table fixed to the frame and having a central opening, a cam-shaft journaled for rotation in the frame below the table and extending diametrally across said opening, a horizontal annular plate mounted for rotation on and relative to said table and surrounding said opening, a plurality of vertical columns rigidly supported by the frame, a sliding plate slidably mounted on the columns for vertical movement relative to the frame, working units mounted on the sliding plate and on the table for assembling articles of manufacture thereon, a plurality of cams on the cam-shaft, mechanical linkages supported by said frame and extending between said cams and said working units and said sliding plate, at least some of said mechanical linkages extending through said opening, and means connected to said cam shaft to rotate said cam-shaft thereby to operate said mechanical linkages to actuate said working units and to raise and lower said sliding plate.

2. An assembly machine as claimed in claim 1, said mechanical linkages for actuating said working units that are mounted on the table being disposed outside said table and cooperating with the cams on an end of said cam-shaft.

3. An assembly machine as claimed in claim 1, said cams being in two parts whereby said cams can be fixed on the cam-shaft without dismounting the cam-shaft from the frame.

* * * * *